(12) United States Patent
Clancy

(10) Patent No.: US 7,770,299 B2
(45) Date of Patent: Aug. 10, 2010

(54) MASONRY LINE BLOCK

(76) Inventor: Andrew Clancy, 7520 237th St. SW., Edmonds, WA (US) 98026

( * ) Notice: Subject to any disclaimer, the term of this patent is extended or adjusted under 35 U.S.C. 154(b) by 108 days.

(21) Appl. No.: 12/146,293

(22) Filed: Jun. 25, 2008

(65) Prior Publication Data

US 2009/0320306 A1    Dec. 31, 2009

(51) Int. Cl.
*B43L 13/00* (2006.01)
*G01C 15/10* (2006.01)

(52) U.S. Cl. .......................... 33/408; 33/407

(58) Field of Classification Search ........... 33/404–410, 33/413, 518; D10/61, 64, 65
See application file for complete search history.

(56) References Cited

U.S. PATENT DOCUMENTS

| | | | |
|---|---|---|---|
| 2,623,290 A * | 12/1952 | Kampel | 33/409 |
| 2,893,125 A * | 7/1959 | Kampel | 33/407 |
| 2,948,065 A | 8/1960 | Simonic | |
| 3,119,186 A | 1/1964 | Stewart | |
| 3,200,500 A * | 8/1965 | Stone | 33/409 |
| 3,276,129 A * | 10/1966 | Andrews | 33/407 |
| 3,408,742 A * | 11/1968 | Caprio et al. | 33/409 |
| 3,461,565 A | 8/1969 | Harris | |
| 3,626,434 A * | 12/1971 | Miller | 33/408 |
| 4,084,321 A | 4/1978 | Huston | |
| 4,340,089 A | 7/1982 | Freiherr von Arnim | |
| 4,458,722 A | 7/1984 | Dahn | |
| 4,599,804 A * | 7/1986 | Amos | 33/408 |
| 4,937,946 A * | 7/1990 | Steinhoff | 33/410 |
| D314,920 S | 2/1991 | Blazek | |
| 5,009,015 A | 4/1991 | Redl | |
| 5,125,162 A | 6/1992 | Prebeck | |
| D347,798 S | 6/1994 | Tindoll | |
| 5,711,081 A * | 1/1998 | Zaccaria | 33/409 |
| D445,919 S * | 7/2001 | Heavner | D25/113 |
| 6,412,184 B1 * | 7/2002 | Heavner | 33/409 |
| 6,842,992 B1 * | 1/2005 | Gitt | 33/404 |
| 7,263,779 B1 | 9/2007 | Wells | |
| 7,409,771 B2 | 8/2008 | Bond | |
| D603,063 S * | 10/2009 | Arnold | D25/114 |
| 2007/0089312 A1 * | 4/2007 | Wade | 33/409 |

* cited by examiner

*Primary Examiner*—Yaritza Guadalupe-McCall
(74) *Attorney, Agent, or Firm*—Black Lowe & Graham PLLC

(57) ABSTRACT

An anchoring device for a mason's line and method for its use includes a first and a second spaced apart parallel rail. Each rail includes a belaying nub to provide a protuberance upon which to tie the mason's line and a leg in opposed relation to the belaying nub. A bight spans between the first and the second rail. The bight joins each rail assembly at a junction between the belaying nub and the leg.

19 Claims, 3 Drawing Sheets

MASONRY LINE BLOCK

BACKGROUND OF THE INVENTION

Masonry walls are made of stone, block, or brick laid in stacked horizontal rows known as courses. To ensure that the courses are properly aligned vertically and horizontally in an intended location, a mason starts by setting up the bricks (or stones or other masonry blocks) at two corners of the masonry wall, sets a mason's line, a twisted or braided nylon line using pins.

Most masons use a line pin and nails to fasten line to the structure. The line pin is a steel pin about 4" in length which tapers to a point. Better pins are made of tempered steel. The mason drives the line pin into mortar at the top of the course being laid. The mason's line is then pulled tight between the pins and tied.

Another method of fastening line is with line blocks, L-shaped blocks made of wood, plastic, or metal which have a slit in the center of the block. Wooden blocks are preferred because they grip the corner securely. The line is drawn tight through the slit in the block and held by tension against the finished corner. A similar block is used to fasten the line on the opposite end, thereby setting forth the orientation of the courses.

As masons know, a "trig" is relatively small prop or clip, usually made from light-gauge steel band material or the like, used to support or prop a guide string that marks a straight and level course by which to lay bricks or concrete blocks and the like. Concrete blocks or bricks are usually (but not always) laid in straight courses, one course on top of another, in progressive layers to build planar walls and the like. A mason typically sets up a guide string known as a "mason's line," stretched level and tight across the span of the course, to aid him or her in aligning the blocks or bricks straight and level along the course. Trigs are used to support or prop these guide strings at several points along mid-span of the string because, especially for long courses, the trigs lift the sag out of the mason's line.

The quantity of patents claiming various forms of mason's line blocks or block alternatives bears witness to the necessity and utility of placement of mason's line anchors in the setting of masonry. Some of the notable examples are:

U.S. Pat. No. 2,948,065 issued to Simonic on Aug. 9, 1960 teaches a mason's line holding device which assists a mason in building a straight wall. The device, however, relies upon a nonslip line engaging pad to engage the brick for purposes of anchoring.

U.S. Pat. No. 3,119,186 issued to Stewart on Jan. 28, 1964 teaches a mason's line anchoring device formed as an inverted "U" to straddle a brick. Because of the pronounced thickness of the device necessary to serve as a platform for the pins of circular cross-section, the device according to Stewart could not be used by insertion into voids within the brick.

U.S. Pat. No. 3,461,565 issued to Harris on Aug. 19, 1969 teaches a multipurpose line stretcher for anchoring a mason's line. The line stretcher includes a wide body and two depending legs spaced to straddle a masonry unit or a portion thereof. An extension of the body serves as a tongue for attaching a mason's line.

U.S. Pat. No. 4,599,804 issued to Amos on Jul. 15, 1986 teaches a mason's line guide in two parts that, in cooperation, adjust as a clamp to the brick rather than simply overarching the brick.

U.S. Pat. No. 5,009,015 issued to Redl on Apr. 23, 1991 teaches a pair of flat plates with two rectangular sides providing corner pieces which fit over the top edge of bricks.

U.S. Pat. No. 7,263,779 issued to Wells on Sep. 4, 2007 comprises two identical holders fitted with stagger bolts and guide pins. Each holder further comprises a vee on the first end, the vee having a ramp on either side and a wedge in the base of the vee for removable string engagement. The string is pulled taught between the holders, thereby holding them in place on remotely positioned bricks to be used in aligning further bricklaying.

Each of the above-described devices, while performing the basic functions of positioning a mason's line, do not readily allow the mason to switch from laying brick to block without significant modification of the device, and each has further shortcomings in light of the variety of positions and configurations of brickwork needing to be suitably laid. Therefore, a need exists for improved mason's line anchors that will meet this wide variety of needs.

SUMMARY OF THE INVENTION

An anchoring device for a mason's line and method for its use includes a first and a second spaced apart parallel rail. Each rail includes a belaying nub to provide a protuberance upon which to tie the mason's line and a leg in opposed relation to the belaying nub. A bight spans between the first and the second rail. The bight joining each rail assembly at a junction between the belaying nub and the leg.

BRIEF DESCRIPTION OF THE DRAWINGS

The preferred and alternative embodiments of the present invention are described in detail below with reference to the following drawings.

FIG. 8 shows the brick yoke embodiment as well as a foot attachment for use in block laying;

FIG. 9 shows the use of the brick yoke embodiment with the foot in block laying.

DETAILED DESCRIPTION OF THE PREFERRED EMBODIMENT

The present invention functions as a line block. While it does not replace for line pins and trigs, where used, the use of the trigs is safer and faster. For purposes of this application, the preferred embodiment will be referred to as the "Brick Yoke" which is a nonlimiting embodiment of the novel masonry line block. It is not the inventor's intent to assert the Brick Yoke to be the sole embodiment of the invention.

Figure 1:
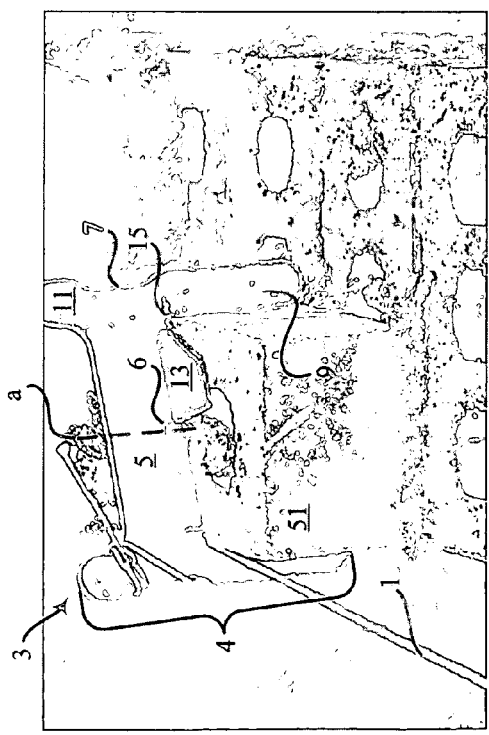
FIG. 1 depicts the brick yoke embodiment straddling a brick to anchor a mason's line.

The Brick Yoke 3 can be better understood with reference to FIG. 1. To this end and to allow FIG. 1 to more clearly illustrate the preferred embodiment, the reference numbers have been equally allotted to both sides of the Brick Yoke 3 with the understanding that the Brick Yoke 3 is symmetric about an axis a. Thus, for example, where FIG. 1 shows the Brick Yoke 3 to include two spaced apart but parallel rails 4, each rail including a belaying nub 11 depending in a first direction and leg 9 depending in opposed relation away from the belaying nub 11 about a line keeper 7 the rail defines. Similarly, although only one wing 13 extending from a bight 5 spanning the spaced apart rails 4 is visible, the preferred embodiment includes a second wing 13 symmetrically disposed such that it extends away from the first wing 13 about the axis a. Additionally, the bight 5 defines a line groove 6 at the axis a offset on the same side of the bight as each of the two legs 9.

Advantageously, the two spaced apart belaying nubs 11 and bight 5 cooperating with the two line keepers 7 together work as a means of managing the length of a mason's line 1. For example, because the bight acts to keep the line keepers 7 fixed in their spatial relationship, mason's line 1 can be wrapped as on a spool around the brick yoke 3 at the line keepers 7. When in use, mason's line 1 is paid out from the line keepers 7 to any anchoring means, including but not limited to a second brick yoke 3. To take up any slack in the line 1, the line 1 may be advantageously wrapped about the belaying nub 11. Depending upon the desired alignment of the line 1 to the yoke 3, either of a line guide 15 (defined by the junction of the leg 9 and the bight 5) or the line groove 6 may be used to fix the line 1 in relation to a brick 51 or block (not shown) the yoke 3 straddles.

In this described preferred embodiment, the yoke 3 is formed of sheet metal suitably cut and subsequently formed to bend the wings 13 perpendicular to the planar sheet metal. In so forming the yoke 3, the legs 9, the nubs 11, and the bight 5 remain in the plane of the yoke 3, allowing them to engage a planar masonry surface. Additionally, as will be later described, the legs are suitable for insertion in unset mortar between bricks 51 or blocks (not shown), without, by act of insertion, moving one or another of the bricks 51 or blocks in relation to those remaining in the wall.

Figure 2:
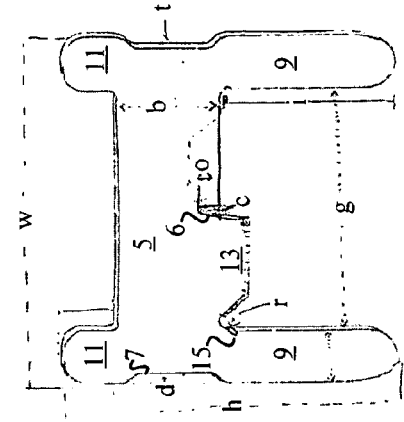
FIG. 2 depicts a preferred embodiment of the brick yoke in accord with United States standardized dimensions of brick and block.

Standardized brick 51 sizes within the United States suggest an advantageous selection of dimensions. A nonlimiting embodiment of the yoke 3 shown in FIG. 2 is formed of a planar sheet of steel having a thickness t. In the embodiment, t is 1/8" thick and has an overall width w from an outer edge of one leg 9 to an outer edge of the other leg 9 of 5¼". Each rail 4 in this nonlimiting embodiment has a height h measured from an extreme tip of the leg 9 to an extreme tip of the belaying nub 11, 4¾". To straddle brick 51 (FIG. 1) and block (not shown) a gap g from an inner edge of a first leg 9, 3¾" to an inner edge of the second leg 9, along a wing edge of the bight 5. Each leg 9 in the preferred embodiment extends from the bight 5 by a length i which in the nonlimiting embodiment is 2½". The line guide 15, may advantageously be selected to have a diameter of 3/32" while the line groove 6 is advantageously selected to have a depth c of ½". The wings 13 may extend perpendicularly from the bight 5 by an offset o of 1⅛". The bight 5 itself, in this preferred embodiment, has a breadth b parallel to the height h, the breadth b being selected to be 1½". The line keeper 7 that the rail 4 defines advantageously has a depth of 3/16".

Referring again to FIG. 1, the Brick Yoke 3 is shown to demonstrate a method of use for aligning a course of bricks 51 during laying. As shown, the yoke 3 is positioned such that the legs 9 straddle and engage the brick 51. The mason's line 1 is tied by means of a slip knot about the belaying nub 11 and then extending advantageously around the line keeper 7 and then through the line guide 15 to precisely align the line 1 with an upper surface of the brick 51 and several bricks 51 that make up the intended course.

Figure 3:
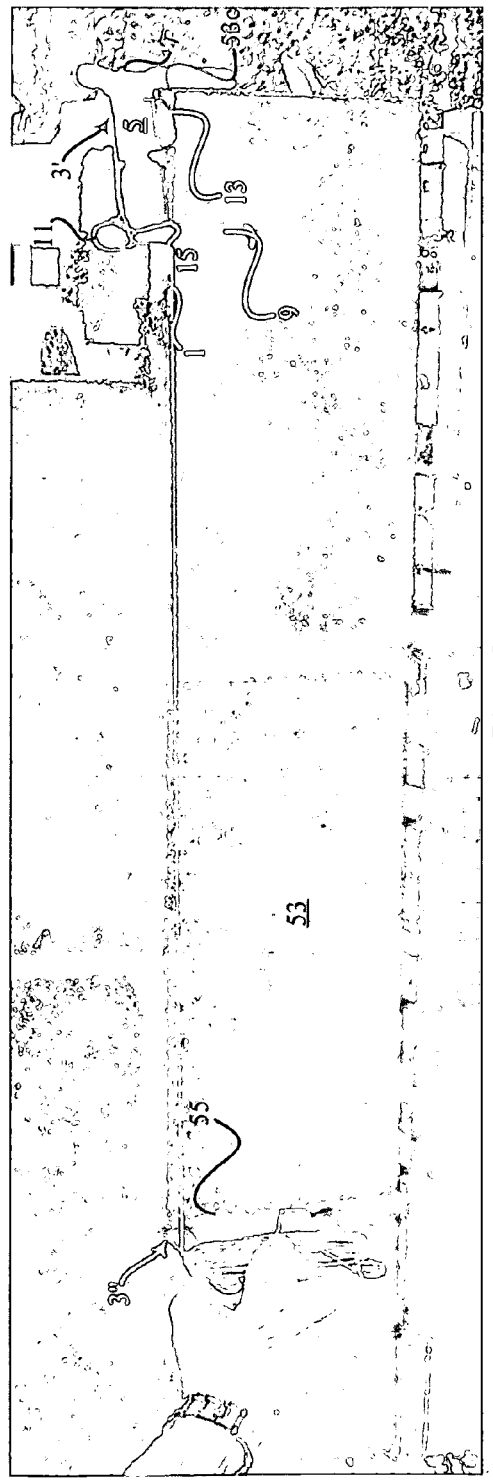
FIG. 3 depicts a pair of the brick yoke embodiment in use to lay block.

A pair of yokes 3 are used in FIG. 3, showing the versatility of the yoke 3 in its intended use. A first yoke 3' is used as a corner anchor to the line 1, such that the legs 9 straddle a corner 53c of a block 53 and rest upon a planar face of each of the wings 13 for stability. Tension on the line 1 holds the outer leg 9 against the corner 53c. As in FIG. 1, the slip knot is used to secure the line 1 about the belaying nub 11 and then extends through the line guide 15 along the course of blocks 53 to the second yoke 3". The second yoke 3" has been inserted into the mortar 55 to serve as a second anchor for the line 3.

Figure 4:
FIG. 4 depicts the brick yoke embodiment in use as a "line block"-type of anchor.

Still another advantageous use of the yoke 3 is illustrated in FIG. 4. In this use, the yoke 3 is used as a form of anchor known to masons as a chicken leg. One of the wings 13 of the yoke 3 is brought to engage the brick 51 at an end of a pair of courses such that the legs 9 rest against a lateral surface of bricks in each of the pair of courses. To keep the yoke 3 against the courses, the line 1 is again tied to the belaying nub 11 and wrapped through the line keeper 7, around the bight 5, over the wing 13, and through the line groove 6, and, finally, along an upper edge of the brick 51.

Figure 5:
FIG. 5 depicts the brick yoke embodiment used over the upper surface of a brick.

Yet another use of the yoke 3, very much like that illustrated in FIG. 4, is shown in FIG. 5, where, rather than relying solely on the tension on the line 1, the wing 13 is inserted in mortar 55 on an outer planar surface of the brick 51. The legs 9 rest against an upper surface of the brick 51. For this use, the line 1 is again tied to the belaying nub 11 and, again, threaded through the line guide 15 along the upper edge of the brick 51 to define an upper edge of the intended course of bricks 51. The second leg 9 engages the outer surface of the brick 51. As in the earlier uses, the line is tied at the belaying nub 11 and passes over the line keeper 7 through the line guide 15 and along the upper edge of the brick 51.

Figure 6:
FIG. 6 depicts the brick yoke embodiment used straddling the brick in close proximity to a block wall.

Previously discussed applications have been shown in a context where there is adequate clearance on all sides to allow positioning of the yoke 3 in a variety of positions. In FIG. 6, little clearance is available on one side of the bricks 51, therefore requiring use of the legs 9 to engage the brick 51 on outer faces while resting on the brick 51 by the wings 13. Tied, as before, to the belaying nub 11, the line 1 is wrapped around the line keepers 7 and through the line guide 15 to follow the upper edge of the brick 51.

Figure 7:
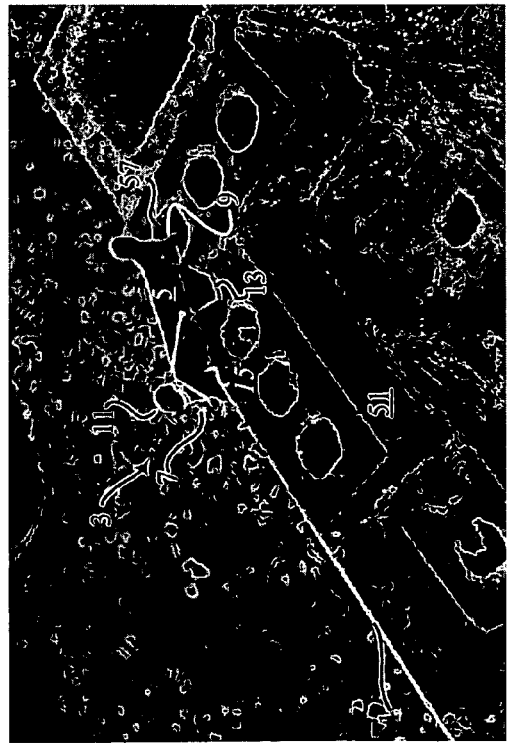
FIG. 7 shows insertion of the brick yoke embodiment into a brick to build a brick corner.

Another use at the same corner is illustrated in FIG. 7, where instead of engaging the brick 51 at its outer surfaces, the yoke 3 engages the brick 51 by insertion in a hooking fashion into a void 57 in the brick 51. As discussed above, the yoke 3 rests upon the upper surface of the brick 51 on the wings 13 as the line 1 passes from the belaying nub 11 through the line keeper 7 and the line guide 15 to extend along the upper edge of the brick 51.

The yoke 3 is shown in the context of laying block 53 in FIG. 8. While, generally, the yoke 3 has been discussed in terms of its use on bricks 51, the yoke can serve with equal utility in the setting of blocks 53 rather than bricks. Additionally, where an already built corner includes mortar too hard to use a line pin as an anchor, the yoke may still be advantageously used. In another context, much as discussed above in relation to FIG. 6, where an existing structure is too close to allow, the yoke 3 may be readily used. To assist the yoke 3 in the context of laying block 53, a foot assembly 30 is provided. The foot assembly 30 includes an angled bracket 33, a plate 33, cooperating by means of a pair of fasteners 39 (shown in this case as a nut and bolt combination; however, many distinct fasteners may be exploited, such as, by way of nonlimiting example, a bolt and cam lock nut assembly, or in another alternate embodiment, a bolt and wing nut in combination).

In FIG. 9, the foot assembly 30 is shown in its operative position, clamped on a leg 9 of the yoke 3. So configured, the yoke 3, with the foot 30 in place, is inserted into a void 59 in the block 53. So placed, the yoke 3 rests against the upper surface of the block 53 by its wing 13 as the bracket 33 bears against walls of the void 59. As in other exemplary configurations set forth above, the line 1 is tied to the belaying nub 11. In this nonlimiting example, the line 1 is threaded across the bight 5 through the line keeper 7 and around the leg 9 through the line guide 15 and along an upper edge of the block 53.

While the preferred embodiment of the invention has been illustrated and described, as noted above, many changes can be made without departing from the spirit and scope of the invention. For example, trigs may be used with the yokes to support the line over large spans. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An anchoring device for a mason's line, the device comprising:
    a first and a second spaced apart parallel rail, each rail including:
        a belaying nub to provide a protuberance upon which to tie the mason's line; and
        a leg in opposed relation to the belaying nub;
    a bight spanning between the first and the second rail, the bight joining each rail at a junction between the belaying nub and the leg; and
    a pair of wings depend from the bight in opposed and symmetric relationship, about an axis, the wings extending perpendicularly from the bight such that a wing edge of the bight, in cooperation with an inner edge of each of the legs, defines a u-shaped channel for engaging masonry.

2. The device of claim 1, wherein:
the rails define, at an outer edge, a line keeper generally at the junction.

3. The device of claim 1, wherein:
the line keeper is defined to have a depth of approximately ⅜".

4. The device of claim 1, wherein:
the bight and the leg cooperate to define a line guide.

5. The device of claim 4, wherein:
the line guide is generally circular in shape, having a diameter of approximately 3/32".

6. The device of claim 1, wherein:
the u-shaped channel includes the inner edges of the legs of approximately 2½" in length and the wing edge of the bight of approximately 3¾" in length.

7. The device of claim 6, wherein:
the bight defines a line grove on the axis situated between the wings.

8. The device of claim 7, wherein:
the line groove is approximately ¼" in depth.

9. The device of claim 1, wherein:
the device is formed from a generally planar sheet of metal.

10. The device of claim 9, wherein:
the generally planar sheet of metal is generally ⅛" thick.

11. The device of claim 1, having a width of approximately 5¼" overall and wherein:
the rails have a length of approximately 4¼" overall from an extreme tip of the belaying nub to an extreme tip of the leg.

12. The device of claim 1, wherein:
the bight has a breadth of approximately 1½".

13. The device of claim 1, further comprising:
a foot assembly including:
    a bracket;
    a plate; and
    a pair of fasteners configured to draw the bracket and plate into grasping engagement about one of the two legs.

14. The device of claim 13, wherein the fastener includes:
a bolt; and
a nut selected from the group consisting of a nut, a wingnut, and a cam lock nut assembly.

15. A method of anchoring a mason's line, the method comprising:
    tying a mason's line to a belaying nub on an anchoring device, the belaying nub being connected to a leg in opposed relation to form one of two identical rails;
    threading the line through a line guide that the leg and a bight spanning between and connecting to the rails, define;
    engaging a brick with at least one of two wings extending perpendicularly from the bight, the wings being symmetrically disposed about a central axis of the bight; and
    drawing the mason's lines to a point removed from the device to define an intended course of additional bricks.

16. The method of anchoring of claim 15,
wherein engaging the brick is engaging the brick on an upper face.

17. A method for anchoring a mason's line, the method comprising:
    tying a mason's line to a belaying nub on an anchoring device;
    clamping a leg of a foot assembly to an anchoring device, the anchoring device comprising two rails each including the leg and the belaying nub in opposed relationship, and a bight spanning between and connecting the rails at point where the belaying nub joins the leg, the clamping, being clamping to one of the two legs;
    inserting the foot assembly into a void in a concrete block for laying;
    resting the anchoring device on at least one of two wings that extend symmetrically and perpendicularly from the bight; and
    drawing the mason's lines to a point removed from the device to define an intended course of additional blocks.

18. The method of claim 17, wherein:
the clamping is by drawing the plate to the bracket in engaging relationship to one of the two legs by tightening at least one fastener assembly, the at least one fastener assembly including a bolt and a threaded device selected from the group consisting of nut, wing nut, and cam lock.

19. The method of claim 18, wherein:
drawing includes drawing the mason's line over the bight and through a line guide a junction of the bight and a leg defines.

* * * * *